Jan. 18, 1966     W. J. JOYCE, JR     3,230,008
SAFETY BELTS
Filed Nov. 8, 1963
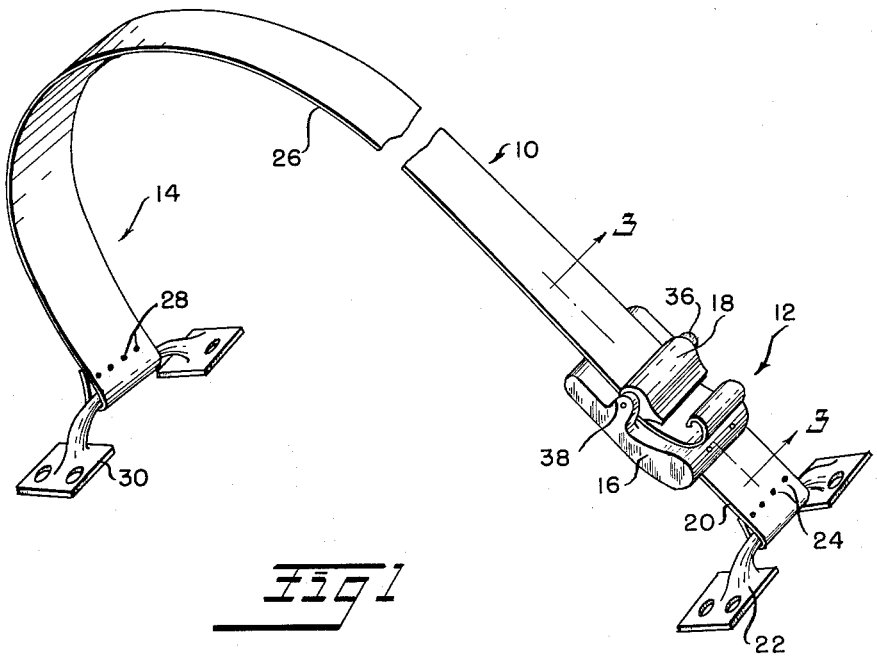
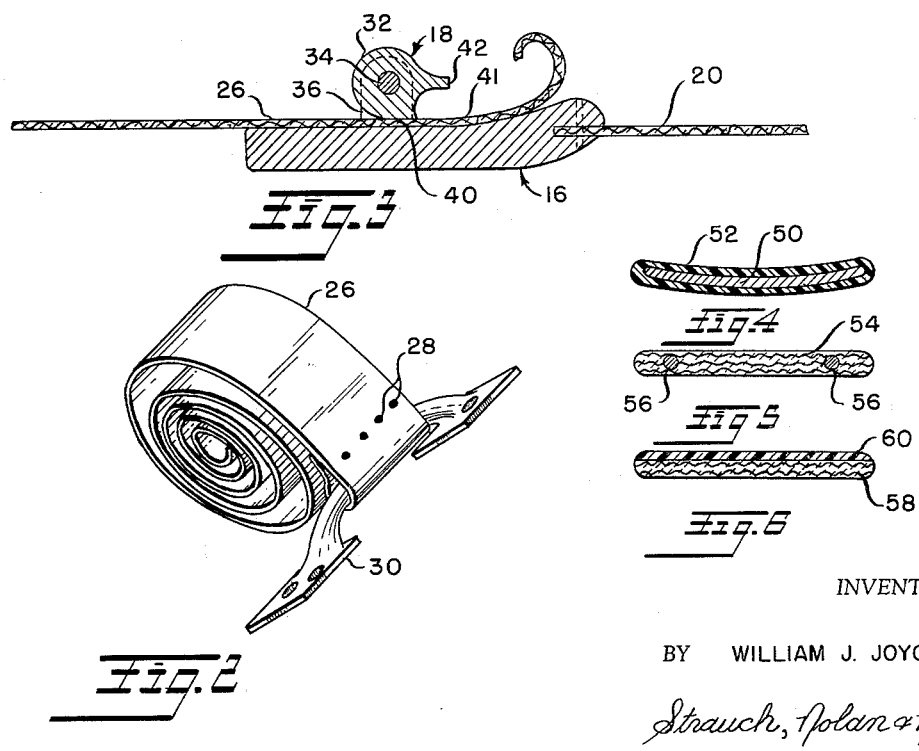
INVENTOR.
BY    WILLIAM J. JOYCE, JR.
Strauch, Nolan & Neale United States Patent Office 3,230,008
Patented Jan. 18, 1966

3,230,008
SAFETY BELTS
William J. Joyce, Jr., Detroit, Mich., assignor, by mesne assignments, to Rockwell-Standard Corporation, a corporation of Delaware
Filed Nov. 8, 1963, Ser. No. 322,456
1 Claim. (Cl. 297—388)

The present invention relates to safety belts for automotive vehicles and more particularly to safety belts which are self-retracting.

Despite the widespread recognition of the value of safety belts, their acceptance by the public has been limited, partly because conventional belts are unsightly and inconvenient to use. When conventional seat belts are not in use they lie loosely on the seat or on the floor beside the seat. The buckles may mar or otherwise damage the upholstery of the seat and the outer straps of the seat belts may become caught between the door and the frame of the vehicle when the doors are opened or closed. The occupant of the vehicle often has to search for the straps when entering the vehicle.

For these reasons, proposals have been made to retract the straps of the safety belt out of the way to an easily reachable but inconspicuous position. However, these prior suggestions have involved relatively complex, vulnerable retracting mechanisms which, for the most part, are too expensive and too bulky to be feasible for use in automobiles. In general such prior proposals incorporate a spring loaded pickup reel and a variety of mechanisms for locking the belt in the desired extended position. Usually a coiled clock type spring is used to wind up the belt and this type of spring has a limited service life.

With these considerations in mind it is a primary purpose and object of the present invention to provide novel self-retracting safety belts which avoid the foregoing disadvantages of prior devices.

It is a further object to provide improved self-retracting safety belts for automotive vehicles which have a built in roll up characteristic and thus eliminate the usual bulky, expensive mechanical retracting mechanisms.

It is also an object of the present invention to provide improved self-retracting safety belts which are relatively inexpensive to manufacture and which are of uncomplicated, compact construction.

It is an additional object of the present invention to provide improved safety belts which may be quickly and easily clasped and unclasped.

Additional objects and advantages of the present invention will become apparent as the description proceeds in connection with the accompanying drawings in which:

FIGURE 1 illustrates the safety belt of the present invention in a position of normal use;

FIGURE 2 illustrates the seat belt of FIGURE 1 in its retracted position;

FIGURE 3 is an enlarged fragmentary section taken along line 3—3 of FIGURE 1 showing details of the buckle assembly; and FIGURES 4, 5 and 6 are transverse sections showing three different embodiments of the internal construction of the safety belt strap.

Referring now more particularly to the drawings, the safety belt of the present invention, indicated generally at 10, comprises a relatively stationary inextensible buckle portion 12 and an extensible strap portion 14. The buckle portion 12 comprises a metal buckle or clasp assembly 16 including a lock assembly 18 for releasably engaging the extensible strap 14. The clasp assembly 16 is suitably secured to a short strap 20 of tough plastic material or webbing conventionally used in the manufacture of seat belts. The strap 20 is secured to a fitting 22 by means of rivets 24 or by stitching. The fitting 22 may be bolted to the floor of the vehicle or to the seat frame depending upon the configuration of the particular installation.

Portion 14 of a safety belt comprises an extensible self-retracting strap 26 which has an inherent self-coiling characteristic as described in detail below. One end of the strap 26 is secured by rivets 28 or by stitching to a fitting 30 adapted to be bolted to any convenient structural part of the vehicle. In most installations the belt will be arranged with the fittings 22 and 30 at the opposite sides of the seat.

The lock assembly 18 comprises a locking member 32 pivotally mounted on a pin 34, the opposite ends of which are received in upstanding ears 36 and 38 formed integrally with the main body of the buckle member 16. The locking member 32 has a lower cam surface 40 normally abutting the smoothly curved upper surface 41 of the buckle body when the strap 26 is removed from the buckle.

To fasten the safety belt, the strap 26 is inserted between the locking member 32 and the surface 41 of the body 16 and is pulled through until the desired degree of tightness is achieved. When the end of the strap is released the strap is securely held in position. When the strap begins to pull away from the buckle, a friction force is established between the locking member and the buckle body which tends to rotate the locking member toward the strap and thereby increases the locking effectiveness of the assembly. With any increase of the separating force, the friction between the members and the strap will also increase, thus providing a secure lock even under extreme impact loads. The belt may be unlocked by simply raising a lever 42 formed integrally with the forward end of the locking member 32.

The buckle assembly thus provides a strong attachment and yet is capable if being quickly released without special manipulation and thus provides an additional measure of safety by permitting the occupant to leave the vehicle rapidly under emergency conditions.

A primary feature of the present invention resides in the structure of the strap 26 which is so constructed that it automatically assumes the coiled configuration shown in FIGURE 2. FIGURES 4, 5 and 6 are sections of three embodiments of the tape 26 which are exceptionally strong and yet possess the self-coiling characteristics.

FIGURE 4 illustrates a tape comprising a metal spring core 50 of spring steel which is shaped to assume the configuration of FIGURE 2 when relaxed. The metal core 50 preferably has a slightly concave-convex cross-section to enhance its self-coiling ability. Also, the core 50 is preferably covered with a layer of fabric or plastic material 52 to protect the spring itself and to protect the user against possible injury from the relatively sharp edges of the spring and to enhance the appearance of the strap.

The modified tape of FIGURE 5 comprises a body 54 of woven fabric or webbing of the type conventionally employed in safety belt construction. Inserted within the body 54 are two or more pre-coiled wire strips 56 which are permanently bent to provide the required self-coiling action.

The strap illustrated in FIGURE 6 comprises a layer of fabric material 58, to one side of which is secured, for example by sewing or bonding, a layer of elastic material 60 which has been pre-stretched in such a manner that the strap, in its free state, rolls itself up along the side containing the pre-stretched material.

In all forms of the invention the free end of the strap is bent to form a coil core 62 about which the strap automatically coils when it is released.

It will be apparent from the foregoing that the present invention has provided novel self-retracting safety belt structures which are light in weight, easy to attach, which require minimum space, which are attractive in appearance and which do not require maintenance. The safety belts of the present invention are also unusually strong since the structure which imparts to the strap its self-coiling ability also considerably reinforces the belt. Also it is to be noted that in preferred installations, the buckle assembly is positioned at the side and rearwardly of the wearer so that only the smooth surface of the strap touches the wearer. In prior devices the buckle assembly is normally in the middle of the belt and thus is in contact with the body of the wearer which creates an uncomfortable localized body pressure.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by Letters Patent is:

A safety belt construction for a vehicle comprising a buckle assembly adapted to be secured within the vehicle, a flexible strap assembly having a fabric body and having a fixed end adapted to be secured within said vehicle and a free end adapted to be releaseably engaged by said buckle assembly, the portion of said strap assembly between said buckle assembly and said fixed end being completely uncoiled whenever said strap assembly is engaged by said buckle assembly, the free end of said strap projecting beyond said buckle assembly being bent to form a coil core and the body of said strap being tensioned when extended and being so constructed that when relaxed it coils upon itself about said coil core whereby when said strap is released from said buckle assembly it automatically retracts to a position adjacent its fixed end.

References Cited by the Examiner

UNITED STATES PATENTS

| | | | |
|---|---|---|---|
| 2,162,551 | 6/1939 | Hawley | 161—244 |
| 2,480,915 | 9/1949 | George | 297—388 |
| 2,956,795 | 10/1960 | Foster | 33—138 X |
| 3,116,092 | 12/1963 | Spranger | 297—388 |

FRANK B. SHERRY, *Primary Examiner.*